United States Patent
Shimoda et al.

(10) Patent No.: US 11,493,898 B2
(45) Date of Patent: Nov. 8, 2022

(54) SERVO MOTOR CONTROLLER

(71) Applicant: FANUC CORPORATION, Yamanashi (JP)

(72) Inventors: Takaki Shimoda, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 40 days.

(21) Appl. No.: 17/073,612

(22) Filed: Oct. 19, 2020

(65) Prior Publication Data

US 2021/0157294 A1     May 27, 2021

(30) Foreign Application Priority Data

Nov. 21, 2019    (JP) ............................. JP2019-210395

(51) Int. Cl.
     *G05B 19/18*      (2006.01)

(52) U.S. Cl.
     CPC .... *G05B 19/18* (2013.01); *G05B 2219/34013* (2013.01)

(58) Field of Classification Search
     CPC ....................... G05B 19/18; G05B 2219/34013
     See application file for complete search history.

(56) References Cited

U.S. PATENT DOCUMENTS

| | | | | |
|---|---|---|---|---|
| 2004/0257027 A1* | 12/2004 | Matsuo | ................... | H02P 21/26 |
| | | | | 318/722 |
| 2013/0307452 A1* | 11/2013 | Sonoda | ..................... | H02P 6/18 |
| | | | | 318/400.32 |
| 2014/0232310 A1* | 8/2014 | Bartalucci | ............... | H02P 6/153 |
| | | | | 318/400.07 |
| 2016/0041010 A1* | 2/2016 | Hara | ........................ | G01D 5/14 |
| | | | | 324/207.13 |
| 2016/0138942 A1* | 5/2016 | Takahashi | ............ | G01D 5/2448 |
| | | | | 324/207.12 |
| 2017/0307416 A1* | 10/2017 | Tsukamoto | ............ | G01D 5/245 |

FOREIGN PATENT DOCUMENTS

| | | |
|---|---|---|
| JP | H06-034390 A | 2/1994 |
| JP | 2006-310925 A | 11/2006 |
| JP | 2013-117430 A | 6/2013 |
| JP | 2013-205163 A | 10/2013 |

* cited by examiner

*Primary Examiner* — Thomas C Lee
*Assistant Examiner* — Ameir Myers
(74) *Attorney, Agent, or Firm* — Studebaker & Brackett PC

(57) ABSTRACT

A servo motor controller is provided which enables an offset to be set more easily and accurately, in comparison to the conventional technique. A servo motor controller for controlling a servo motor of an industrial machine includes: a position detection unit that detects a position of the servo motor; a magnetic-pole detection unit that detects a magnetic-pole phase of the servo motor; and a phase calculation unit that determines a calculation-based phase based on position data of the servo motor and magnetic-pole gap information of the servo motor. The servo motor controller is configured to acquire an offset relationship between the magnetic-pole phase detected by the magnetic-pole detection unit and the calculation-based phase determined by the phase calculation unit, after a reference position is passed through.

3 Claims, 4 Drawing Sheets

SERVO MOTOR CONTROLLER

This application is based on and claims the benefit of priority from Japanese Patent Application No. 2019-210395, filed on 21 Nov. 2019, the content of which is incorporated herein by reference.

BACKGROUND OF THE INVENTION

Field of the Invention

The present invention relates to a servo motor controller.

Related Art

Servo motors are included in industrial machines. For example, the servo motor is used to drive a spindle of a machine tool so that a rotation number, a speed and a torque are controlled. A servo motor controller drives and controls the servo motor by detecting a position of the motor and a magnetic-pole position (a phase (angle) of a motor magnet) using a detector, by determining a voltage directive value based on various feedback values provided from the detector, and by applying a voltage modulated by a pulse width modulation (PWM) method.

On the other hand, encoders of an incremental type, such as an incremental encoder, are frequently used as a detector for detecting position information (movement information) such as an angle of rotation. For example, the encoder of this type includes a plurality of detection elements arranged to output detection signals of different phases, and is configured to detect the position information based on the detection signals outputted by the plurality of detection elements.

In the case where an incremental encoder is used as a detector of a machine, the relationship between the absolute coordinates of the machine and the position signal of the encoder is unknown at power-on. Accordingly, an absolute position by which the aforementioned relationship is determined needs to be established. The absolute position is established through a reference position return operation which is performed based on a Z-phase signal of the incremental encoder. For the absolute position establishment, the reference position return, i.e., offset compensation is implemented to determine and store a reference position as an operation reference for the industrial machine.

Japanese Unexamined Patent Application, Publication No. 2006-310925 discloses an offset value calculation method which is applicable to a position detection system of an optical system of a video camera, and is for calculating, based on a sine wave signal outputted from a magnetoresistance element, an offset value of the sine wave signal so as to determine a distance to an object. The calculation method includes: moving the object by one cycle of the sine wave signal or more; acquiring the sine wave signal at predetermined sampling intervals; based on the acquired sampling data, calculating a differential parameter equivalent to a second order derivative of the sine wave signal; calculating data corresponding to each data item of the acquired sampling data using the differential parameter; and averaging the calculated data so as to calculate the offset value.

Japanese Unexamined Patent Application, Publication No. 2013-117430 discloses a position detection circuit including: a phase signal generation circuit into which a sine wave signal and a cosine wave signal are inputted, the sine wave signal and the cosine wave signal being outputted from a magnetoresistance sensor in accordance with a position of a position detection target in a moving direction and having phases orthogonal to each other, the phase signal generation circuit calculating an arctangent of a ratio between the sine wave signal and the cosine wave signal and generating a phase signal indicating a phase of the sine wave signal or the cosine wave signal; and a position calculation circuit which adds or subtracts a predetermined offset to or from the phase signal every 360° so as to calculate the position of the position detection target in the moving direction.

Japanese Unexamined Patent Application, Publication No. 2013-205163 discloses an encoder including: n detection elements which supply output signals having different phases in accordance with position information of a driven body; a compensator which defines N phase signals (wherein N=n) resulting from equal division of m cycles (wherein m is an integer of 1 or greater) as a reference signal, which compensates, based on each phase difference between the N phase signals and the n output signals and based on the n output signals, each of the n output signals to make the n output signals equal to the N phase signals, and which generates compensated output information; and a detector which detects the position information of the driven body based on the compensated output information generated by the compensator.

Japanese Unexamined Patent Application, Publication No. H06-34390 discloses a position detection device which has a magnetic storage medium storing a magnetic signal, and a magnetic sensor including magnetoresistance effect elements (MR elements) as sensor elements, and which is configured such that the magnetic sensor detects a position of the magnetic storage medium in a state where the magnetic storage medium and the magnetoresistance effect elements have moved relative to each other, wherein the magnetic storage medium further stores, on one track and in storage units of $\lambda$, a group of successive magnetic signals having a length P (P=k$\lambda$, wherein k is an integer) and non-magnetization portions having the same length P as that of the group of successive magnetic signals such that the magnetic signals and the non-magnetization portions alternate with each other, and wherein while a pair of MR elements arranged with a gap of $\lambda/2$ interposed therebetween is defined as one positioning sensor element group, the magnetic sensor has at least one positioning sensor element group.

Patent Document 1: Japanese Unexamined Patent Application, Publication No. 2006-310925
Patent Document 2: Japanese Unexamined Patent Application, Publication No. 2013-117430
Patent Document 3: Japanese Unexamined Patent Application, Publication No. 2013-205163
Patent Document 4: Japanese Unexamined Patent Application, Publication No. H06-34390

SUMMARY OF THE INVENTION

On the other hand, it has been desired to develop a technique for implementing offset compensation more easily and accurately.

One aspect of the present disclosure is directed to a servo motor controller for controlling a servo motor of an industrial machine. The servo motor controller includes: a position detection unit that detects a position of the servo motor; a magnetic-pole detection unit that detects a magnetic-pole phase of the servo motor; and a phase calculation unit that determines a calculation-based phase based on position data of the servo motor and magnetic-pole gap information of the servo motor. The servo motor controller is configured to acquire an offset relationship between the magnetic-pole phase detected by the magnetic-pole detection unit and the calculation-based phase determined by the phase calculation unit, after a reference position is passed through.

The servo motor controller according to one aspect of the present disclosure enables an offset to be set more easily and accurately, as compared with the conventional technique.

DETAILED DESCRIPTION OF THE INVENTION

A servo motor controller according to one embodiment will be described with reference to FIGS. 1 to 4.

The present embodiment will be described based on an assumption that a servo motor is used in an industrial machine embodied as a machine tool, and the servo motor controller drives and controls a spindle and the like of the machine tool. However, it should be noted that the servo motor controller of the present disclosure is not limited to the machine tool application, but is applicable to driving and controlling a servo motor included in other industrial machines, such as robots, conveyors, measuring instruments, testing apparatuses, pressing machines, press-fitting machines, printers, die casting machines, injection molding machines, food machines, packaging machines, welders, cleaning machines, painting machines, assembling machines, mounting machines, woodworking machines, sealing machines, and cutting machines.

A machine tool control system (industrial machine control system) according to the present embodiment includes, for example, a computerized numerical control (CNC) as a command unit, and the servo motor controller (control unit, servo amplifier) 1 that drives and controls a servo motor (driver) of the machine tool in accordance with the command from the CNC.

Figure 1:
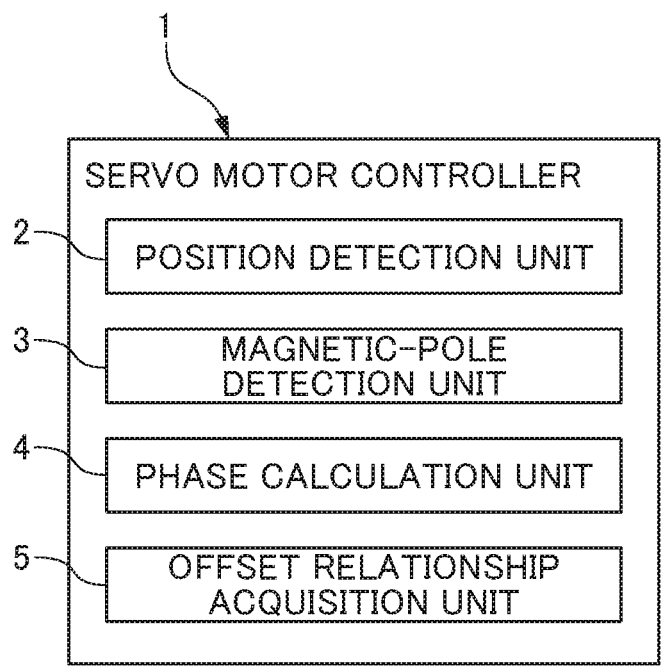
FIG. 1 is a diagram showing a servo motor controller according to one aspect of the present disclosure.
Figure 2:
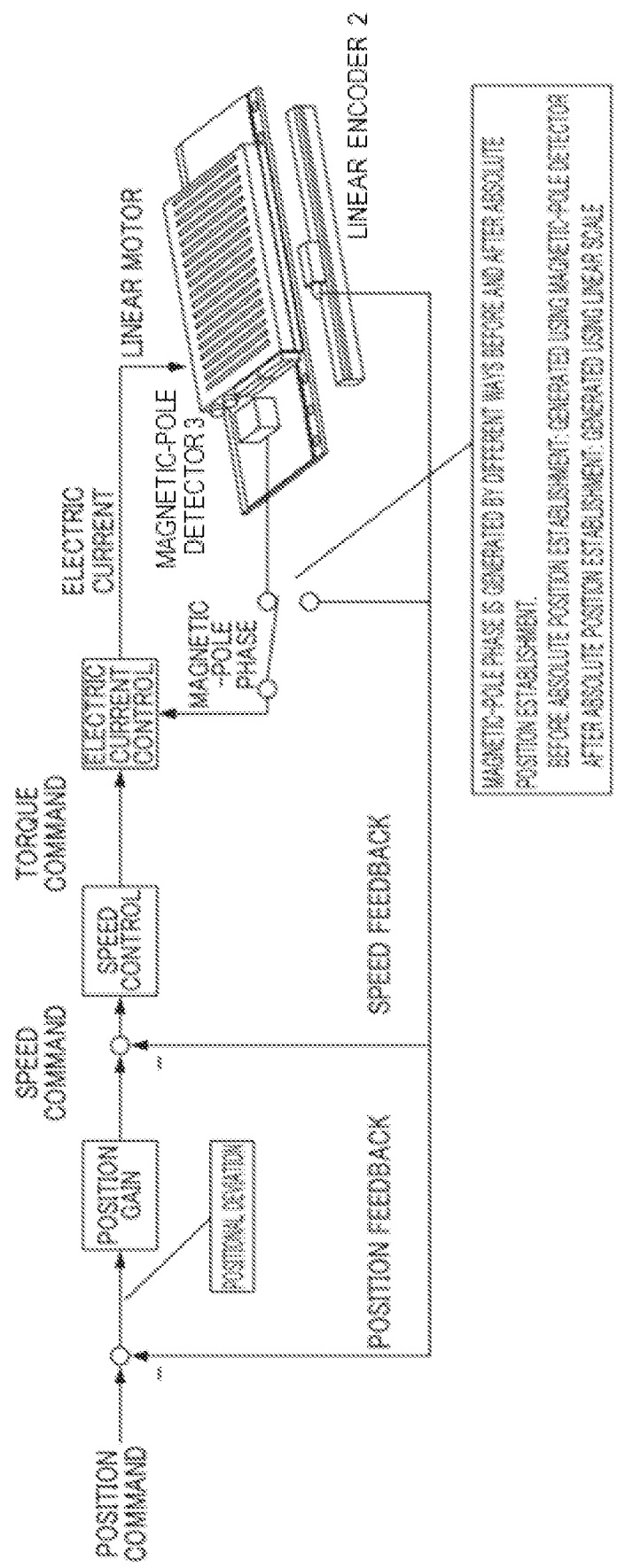
FIG. 2 is a diagram showing an example of a servo motor controller according to one aspect of the present disclosure.

On the other hand, as shown in FIGS. 1 and 2, the servo motor controller 1 according to the present embodiment includes: an incremental type position detection unit (position detector: a linear encoder in FIG. 2) 2 that detects a position of an axis or the like of the servo motor; a magnetic-pole detection unit (magnetic detector) 3 that detects a magnetic-pole position and a magnetic-pole phase of the servo motor; a phase calculation unit 4 that calculates a calculation-based phase from a magnetic-pole phase detected by the position detection unit 2 and magnetic-pole gap information of a motor magnet; and an offset relationship acquisition unit 5 that acquires an offset relationship between the magnetic-pole phase acquired from the magnetic-pole detection unit 3 and the calculation-based phase acquired from the phase calculation unit 4, after a preset reference position is passed through. The servo motor controller 1 is configured to set a magnetic-pole phase offset (also referred to as the AMR offset) between a motor's electrical angle of 0° (a magnetic-pole phase from a U-phase) and a motor reference position (Z-phase).

Here, the terms "absolute position establishment", "magnetic-pole position (magnetic-pole phase)", and "magnetic-pole detection unit (magnetic-pole detector) 3" are explained below.

For an incremental encoder, a relationship between the absolute coordinates of a machine and a position signal of the encoder is unknown at power-on. The term "absolute position establishment" means establishing this relationship. The absolute position establishment is enabled by performing a reference position return operation based on a Z-phase signal of the encoder.

The term "magnetic-pole position (magnetic-pole phase)" means a phase (angle) of a motor magnet. The motor magnet makes one rotation of 360° from the N-pole to the S-pole, and then, to the N-pole.

The "magnetic-pole detector" is a device for generating an electric signal matched with a phase of a motor magnet. For example, if an encoder is to detect both a position and a magnetic-pole position, the magnetic-pole detector can be configured, in advance, to generate a signal of a corresponding magnetic-pole position when a certain angle is formed, based on the relationship between the position and the magnetic-pole position, or can be configured to directly measure a magnetic field using a Hall sensor or the like.

The servo motor controller 1 according to the present embodiment first performs electric current control after the absolute position establishment (following acquisition of a reference position signal) in the following manner.

As shown in FIG. 2, the servo motor controller 1 according to the present embodiment uses, as a magnetic-pole phase for the electric current control, a phase provided from the magnetic-pole detection unit 3 before the absolute position establishment, and a phase provided from the position detection unit 2 after the absolute position establishment. Specifically, the servo motor controller 1 according to the present embodiment takes advantage of a feature in which the position detection unit (position detector) 2 is higher in resolution than the magnetic-pole detection unit (magnetic-pole detector) 3, and uses the phase provided from the position detection unit 2 after the absolute position establishment (after determining a magnetic-pole phase and an offset given by the expression "position/magnetic-pole gap"), to perform the electric current control with high accuracy.

For example, the servo motor controller 1 according to the present embodiment acquires (generates) a magnetic-pole phase before the absolute position establishment by using the magnetic-pole detection unit 3, and acquires (generates) a magnetic-pole phase after the absolute position establishment by using a linear scale in the case of a linear motor, or by using an incremental encoder in the case of a rotary motor.

Figure 3:
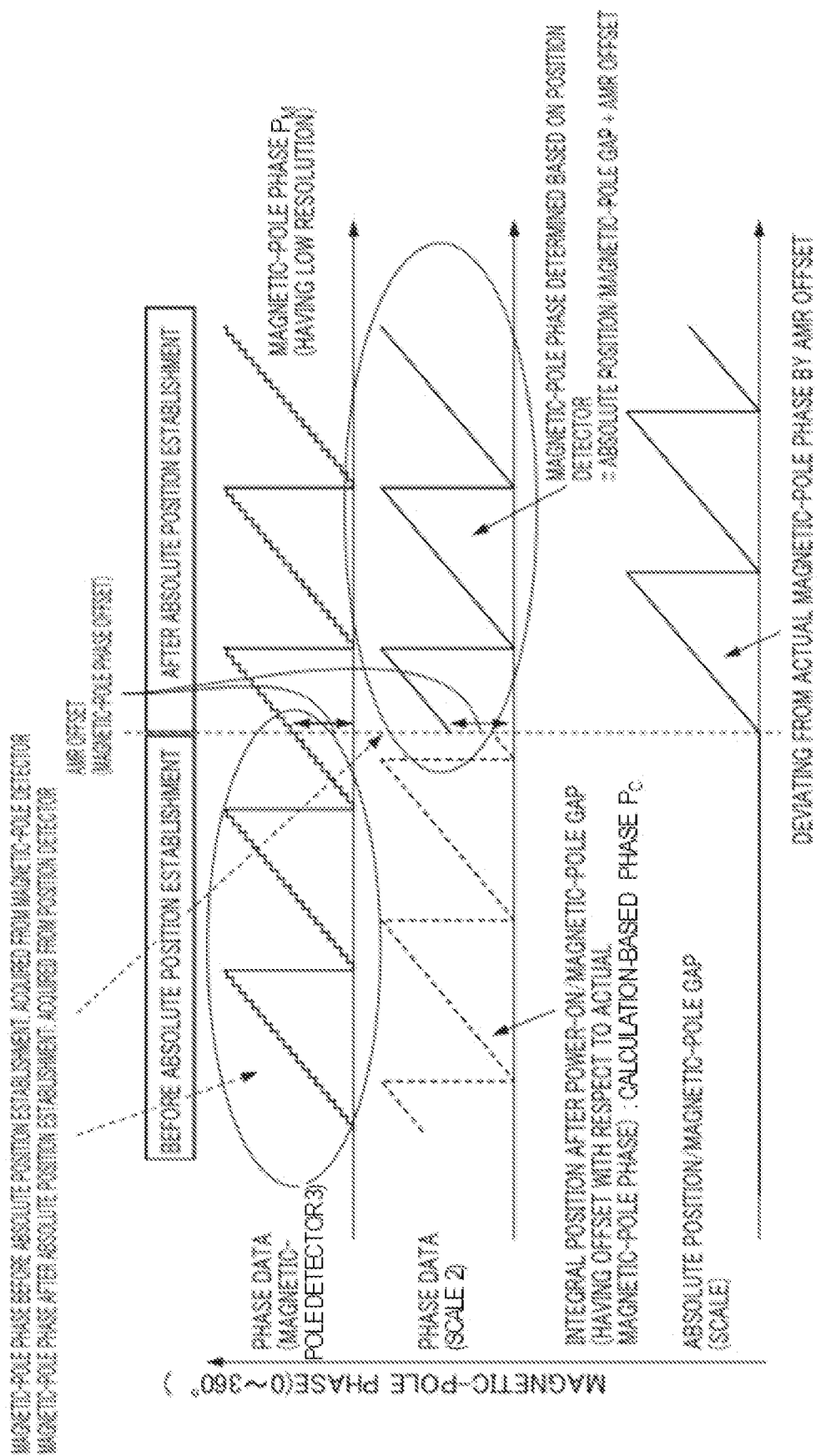
FIG. 3 is a diagram illustrating a setting of a magnetic-pole phase offset (AMR offset) which is implemented using a servo motor controller according to one aspect of the present disclosure.

More specifically, for example, as shown FIG. 3, the magnetic-pole phase $P_M$ before the absolute position establishment is acquired from the magnetic-pole detection unit 3. The magnetic-pole phase $P_M$ before the absolute position establishment is given by the expression "integral position after power-on/magnetic-pole gap", and has an offset (magnetic-pole offset) with respect to the actual magnetic-pole phase.

On the other hand, the magnetic-pole phase is acquired after the absolute position establishment from the position detection unit 2. The magnetic-pole phase after the absolute position establishment is a magnetic-pole phase determined based on the position detection unit 2, and given by the expression "absolute position/magnetic-pole gap+Offset". That is, the servo motor controller 1 according to the present embodiment allows the magnetic-pole phase after the absolute position establishment to deviate from the zero point of the Z-phase by the offset.

For example, according to a conventional technique, since an incremental encoder is basically configured to provide feedback of a relative position, the absolute position is unknown after the power is turned on. The absolute position is not established until the motor is actuated and a Z-phase signal of the encoder is acquired. Before the absolute position establishment, in order to acquire a magnetic-pole phase (electrical angle) for use for control of a motor current, a magnetic-pole phase is acquired based on the magnetic-pole position acquired from the magnetic-pole detection unit 3.

In contrast, the servo motor controller 1 according to the present embodiment is configured to use, after the absolute position establishment, not the magnetic-pole phase $P_M$ provided by the magnetic-pole detection unit 3, but a value (i.e., a calculation-based phase $P_C$) calculated by dividing the absolute position by the magnetic-pole gap. That is, the servo motor controller 1 is configured to acquire the magnetic-pole phase using the result of the encoder that is much higher in resolution than the magnetic-pole detection unit 3. This acquisition of the magnetic-pole phase involves an inconvenience of causing an offset between the calculation-based phase $P_C$ calculated according to the expression "absolute position/magnetic-pole gap" and the actual magnetic-pole phase. The servo motor controller 1 according to the present embodiment is configured to eliminate this inconvenience by performing a compensation process of adding an offset.

In this way, the servo motor controller 1 according to the present embodiment enables an offset to be set more easily and accurately, in comparison to the conventional technique.

Figure 4:
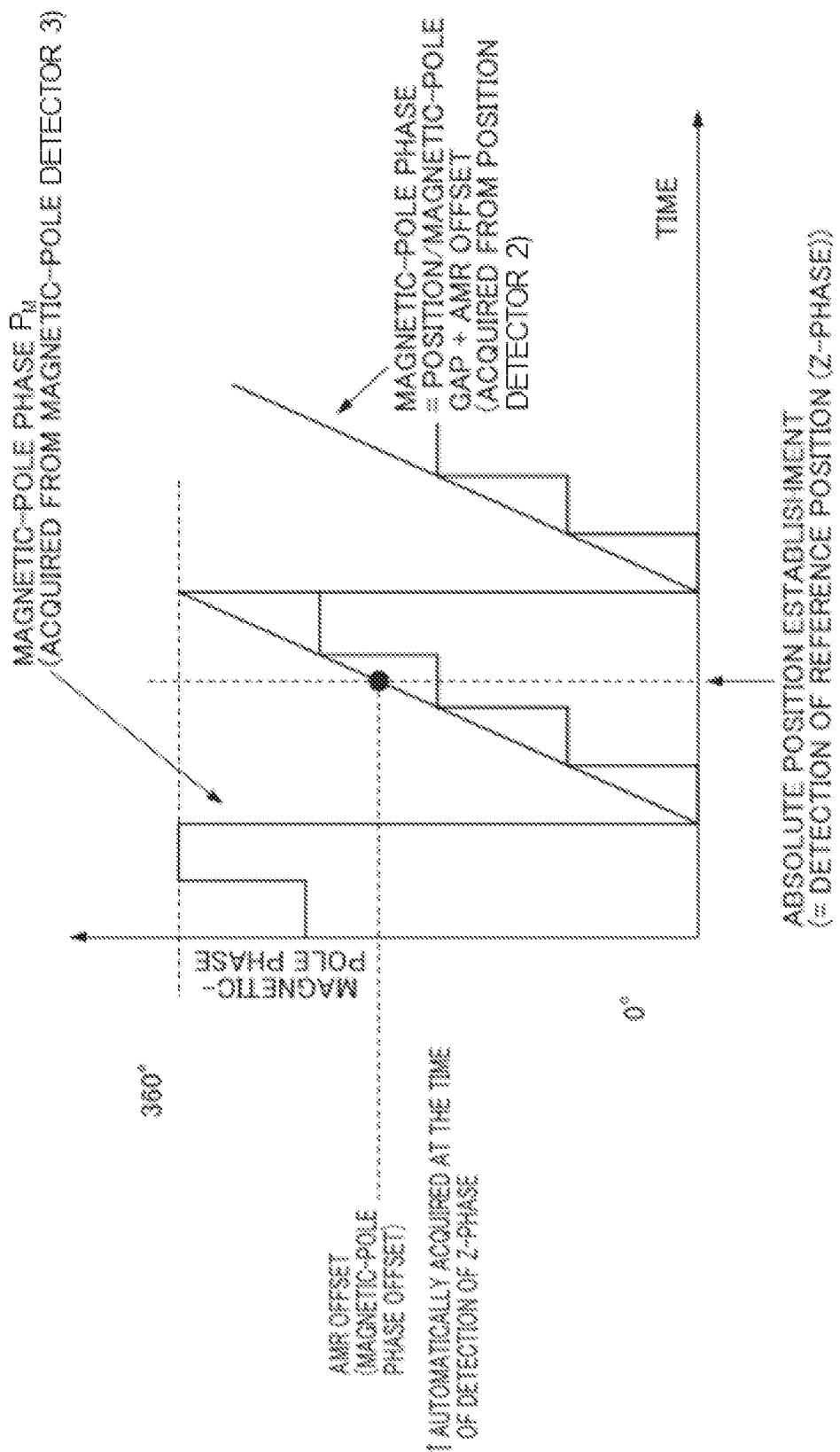
FIG. 4 is a diagram illustrating a setting of a magnetic-pole phase offset (AMR offset) which is implemented using a servo motor controller according to one aspect of the present disclosure.

Here, as shown in FIG. 4, the servo motor controller 1 according to the present embodiment may be configured to improve the accuracy of the offset by acquiring offsets at a plurality of points and by averaging the offsets or selecting an optimum value from the offsets. For example, the servo motor controller 1 may acquire the offset relationship between the magnetic-pole phase and the calculation-based phase a plurality of times, and may newly calculate an offset relationship from at least one of the acquired offset relationships.

As can be seen, the accuracy can be further improved by acquiring data a plurality of times after the absolute position establishment and by acquiring offsets at a plurality of points. Calculating the average value (averaging) of the offsets makes it possible to satisfactorily set an offset accurately, while reducing effect of variation between points of time at which the offsets have been acquired. The optimum value can be acquired by selecting a minimum as the offset in the case of movement in the positive direction or a maximum as the offset in the case of movement in the negative direction. This process also makes it possible to satisfactorily set an offset accurately.

One embodiment of the servo motor controller has been described in the foregoing. It should be noted that the present invention is not limited to the embodiment described above, and modifications can be made as appropriate without deviating from the spirit of the present invention.

EXPLANATION OF REFERENCE NUMERALS

1: Servo Motor Controller
2: Position Detection Unit (Position Detector)
3: Magnetic-Pole Detection Unit (Magnetic Detector)
4: Phase Calculation Unit
5: Offset Relationship Acquisition Unit

What is claimed is:

1. A servo motor controller for controlling a servo motor of an industrial machine, the servo motor controller comprising:
    a position detector that detects a position of the servo motor;
    a magnetic detector that detects a magnetic-pole phase of the servo motor;
    a phase calculator that determines a calculation-based phase based on position data of the servo motor and magnetic-pole gap information of the servo motor; and
    a processor that acquires an offset relationship between the detected magnetic-pole phase and the determined calculation-based phase to adjust an operation of the servo motor controller based on the acquired offset relationship, after a reference position is passed through.

2. The servo motor controller according to claim 1, wherein
    the processor acquires the offset relationship between the magnetic-pole phase and the calculation-based phase a plurality of times, and newly calculates an offset relationship from at least one of the acquired offset relationships.

3. The servo motor controller according to claim 2, wherein the offset relationships are offset values, and
    the processor selects a minimum value among the acquired offset values to adjust the operation of the serve motor controller when the servo motor moves in a positive direction and selects a maximum value among the acquired offset values to adjust the operation of the serve motor controller when the servo motor moves in a negative direction.

* * * * *